June 22, 1943.　　　H. JOHNSTON　　　2,322,298
THERMAL ATTACHING MACHINE
Filed Feb. 28, 1941
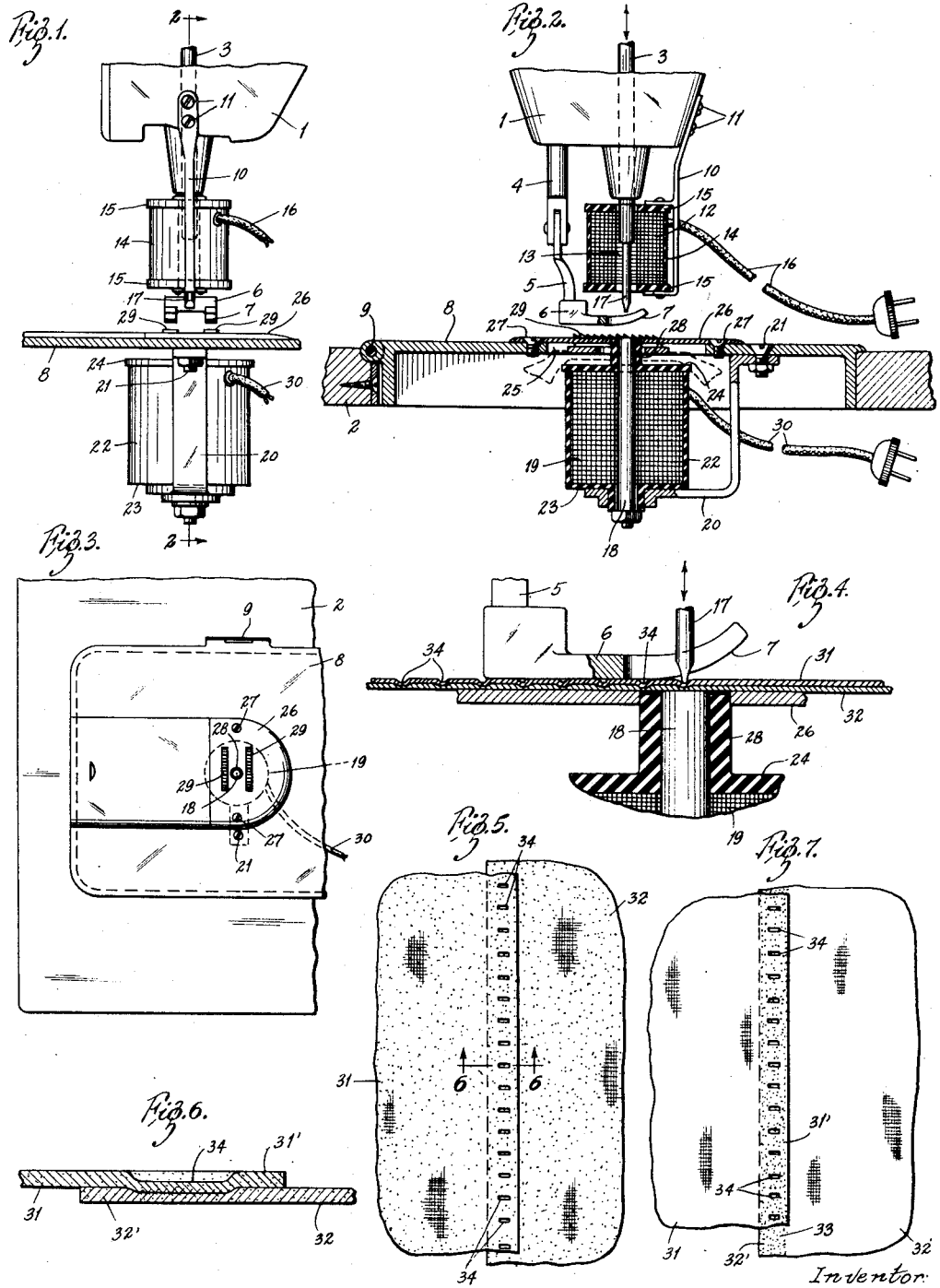
Inventor:
Harry Johnston,
by John D. Rippey
his Attorney Patented June 22, 1943

2,322,298

UNITED STATES PATENT OFFICE 2,322,298

THERMAL ATTACHING MACHINE

Harry Johnston, St. Louis, Mo., assignor, by mesne assignments, to Mercantile-Commerce Bank and Trust Company, St. Louis, Mo., and Edward Greensfelder, St. Louis, Mo., trustees under the will of Wilton Rubenstein, deceased Application February 28, 1941, Serial No. 381,197

7 Claims. (Cl. 154—42)

This invention relates to thermal attaching machines; and has special reference to machines for attaching together superimposed portions of textile fabrics and the like by application of heat and pressure to the superimposed portions of the fabrics during their movement through the machine.

Objects of the invention are to provide mechanism for moving superimposed or overlapped textile materials or the like and applying heat and intermittent pressure to the superimposed or overlapped portions of said materials; to provide mechanism for intermittently moving the materials in one direction, and mechanism acting automatically and as an incident to operation of the machine for applying pressure and heat to spaced portions of the materials to effect attachment thereof by thermoplastic action; and to provide a machine having a heated anvil and a heated plunger cooperating with the anvil to apply heat and pressure to superimposed or overlapped materials moved intermittently between the anvil and the plunger in order to effect thermoplastic attachment of said materials at spaced intervals along a line of attachment.

In the manufacture of some articles of apparel, the use of thermoplastic materials is known, and superimposed or overlapped sections of the materials are attached together by the application of heat and pressure, at least one of the overlapped or superimposed sections of material being thermoplastic. My present invention comprises mechanism for intermittently moving or feeding the sections of material in one direction between a heated anvil and a heated plunger which are coordinated to operate intermittently during the periods of rest or pause of the material sections in order to apply necessary heat and pressure thereto and thereby attach them together by thermoplastic action; and another object of the invention is to provide a mechanism or machine designed and adapted for operation to effect thermoplastic attachment of superimposed or overlapped sections of apparel material.

Various other objects and advantages of the invention will be apparent from the following description, reference being made to the annexed drawing, in which—

Fig. 1 is a front elevation of a portion of a machine embodying the present invention and showing the heating units and material feed mechanism.

Fig. 2 is a vertical front-to-rear sectional view on the line 2—2 of Fig. 1.

Fig. 3 is a plan view showing the relationship of the heated anvil to the feed dog by which the material is moved intermittently through the machine.

Fig. 4 is an enlarged sectional view similar to Fig. 2 showing superimposed or overlapped sections of material passing through the machine and having portions thereof attached together by operation of the present invention.

Fig. 5 is a plan view of portions of two overlapped sections of material that have been attached together thermoplastically by action of this machine.

Fig. 6 is an enlarged cross-sectional view on the line 6—6 of Fig. 5.

Fig. 7 is a plan view similar to Fig. 5 showing portions of two overlapped sections of material adhesively attached together, the adhesive material being applied to the overlapped portions of said sections during their attachment, or prior thereto, as desired.

The frame 1 is supported rigidly above the bed 2 and supports mechanism for imparting rapid vertical reciprocating movements to a bar 3. The reciprocating bar 3 constitutes a part of the present invention. Any mechanism may be employed to reciprocate the bar 3 rapidly. Many such mechanisms are known and commercially used in sewing machines, for example. The mechanism for imparting these reciprocating movements to the bar 3 is not shown in the drawing. The reciprocating bar 3 mounted in the frame 1 is considered sufficient to illustrate these essentials of the present invention.

The frame 1 also supports a vertically movable bar 4. An arm 5 is attached to the lower end of the bar 4 and is formed with a forwardly extended bifurcated portion 6 having a smooth undersurface and an upwardly curved forward end 7. Generally, the element comprising the parts 5, 6 and 7 resembles the presser foot of a sewing machine and may be controlled in like manner.

As shown, a work-plate 8 covers an opening in the bed 2 and is preferably connected thereto by a hinge 9 at its rear edge. The frame 1 may be attached to the work plate 8 and moved thereby from and to the position shown in the drawing (Fig. 2), or may be otherwise supported for movement from and to the position shown, leaving the work plate 8 free to be moved upwardly and rearwardly when the frame 1 is out of the way.

A bracket 10 is detachably secured to the frame 1 by removable and replaceable fasteners 11, and supports an electrical heating device 12 having therethrough an opening 13 into which the bar 3 extends for the reciprocating movements mentioned. The heating element 12 is enclosed in a heat insulating jacket or casing comprising a surrounding wall 14, and end walls 15, the latter having openings registering with the opening 13. An electrical connection 16 from the heating element 12 constitutes means for providing electrical communication from an electrical socket device to said heating element 12.

A plunger 17 is detachably secured to the lower end of the reciprocating bar 3 for operation thereby, and is heated to the degree of intensity desired by the heating element 12. In the arrangement shown, the plunger 17 operates between the arms of the bifurcated member 7 toward and from an anvil 18.

The anvil 18 is supported within a heating element 19 mounted on a bracket 20. The bracket 20 is detachably secured to the underside of the work plate 8 by a removable fastener 21. The heating element 19 is confined within an insulating casing comprising an enclosing wall 22, a lower end wall 23, and an upper end wall 24, which insulate the heating element 19 from all metallic parts of the machine other than the anvil 18. The anvil 18 is located in vertical alinement with the plunger 17.

The work plate 8 is formed with an opening 25 covered by a throat plate 26 secured to said work plate by removable and replaceable fasteners 27. The throat plate 26 is unattached to the heating element 19 and is insulated therefrom by the end wall 24, and is insulated from the anvil 18 by a tubular extension 28 of the end wall 24. The upper end wall of the anvil 18 is approximately even or flush with the upper surface of the throat plate 26.

The invention is embodied in a machine having a feed dog including laterally spaced serrated parts 29 immediately below the arms of the bifurcated element 6. The feed dog has the usual four-motion movements imparted thereto by any suitable mechanism ordinarily used for imparting such movements to feed dogs in sewing machines. The device or feed dog 29 constitutes means for moving the materials intermittently across the same and across the work plate 8 and the anvil 18, and for stopping movement of said materials at intermittent rests. During the intermittent rests of the materials, the heated plunger 17 and the heated anvil 18 cooperate to effect adhesive attachment of the materials at spaced points along the portions of said materials that pass between said plunger and said anvil. An electrical connection 30 from the heating element 19 constitutes means for providing electrical communication from an electrical socket device to said heating element 19.

The machine comprising these elements arranged and combined in the cooperative relationship shown and described is used for applying heat and intermediate pressure to superimposed or overlapped portions of materials and for intermittently moving the materials in one direction automatically and as an incident to operation of the machine for applying heat under pressure to said material. As shown in Fig. 4, the section 31 is superimposed upon or overlaps the section 32. These sections are of textile fabric or like material, and one or both may be thermoplastic as shown in Fig. 5; or, as shown in Fig. 7, the margin 31' of the section 31 or the margin 32' of the section 32 may be thermoplastic, or both or neither of said sections may be thermoplastic as desired. When neither of the margins 31' or 32' is thermoplastic, a quantity of thermoplastic adhesive substance 33 is applied to the margin of one of said sections of material, or to the margins of both of said sections before or during the movement thereof through the machine by the feed device 29 and between the heated plunger 17 and the heated anvil 18. The adhesive substance 33 may be applied manually or otherwise, as desired.

Because of the fact that the feed device 29 operates to move the material intermittently and step by step, with pauses between the intermittent movements, I am enabled to operate the plunger 17 to apply heat and pressure against the superimposed or overlapped sections 31 and 32 and thereby attach said sections together because of the reaction of the thermoplastic material to the application of the heat and pressure. As shown, the parts cooperate to apply heat and pressure at spaced points 34 along the superimposed sections or along the margins of the overlapped sections, thereby securely attaching said sections. However, this spacing of the attached points 34 may be dispensed with and the attachment made continuous by reducing the extent of movement of the materials between intermittent operations, or by widening the end of the plunger 17 and the anvil 18, or by other obvious expedients. I contemplate these and other variations which are considered within the scope of the invention as defined by the appended claims.

I claim:

1. A machine for attaching separate sections of superimposed or overlapped textile materials or the like comprising a bed having an opening, a work plate supported by said bed across said opening, a rigid anvil extending upwardly through said work plate, means for heating said anvil, a device for moving said materials intermittently across said device and across said work plate and said anvil and stopping movement of said materials at intermittent rests, and a heated element supported above and cooperating with said anvil to effect adhesive attachment of said materials at spaced points and during respective rests of said materials along the portions thereof that pass between said anvil and said element.

2. A machine for adhesively attaching separate sections of superimposed or overlapped textile materials or the like along a predetermined line of attachment comprising an anvil, a heating element for heating said anvil, a device for moving said sections of superimposed or overlapped materials to move a line thereof across said anvil, and a heated element supported above and cooperating with said anvil for intermittently pressing said line of materials against said anvil to effect adhesive attachment of said materials at spaced intervals along the line thereof passing above said anvil.

3. A machine for adhesively attaching separate sections of superimposed or overlapped textile materials or the like comprising a bed, a work plate supported across an opening in said bed and having a throat opening, a stationary anvil extending upwardly through said work plate and through said throat opening, means for heating said anvil, a device for moving said sections of materials intermittently in one direction across said stationary anvil and stopping movement of said materials at intermittent rests, and an element supported above and cooperating with said anvil to effect adhesive attachment of said materials at spaced intervals along the line thereof passing between said anvil and said element.

4. A machine for adhesively attaching separate sections of superimposed or overlapped textile materials or the like one of which is thermoplastic along a line of attachment, comprising a rigidly stationary anvil, means for heating said anvil, a device for moving said materals intermittently in a direction in which the line for attachment thereof passes over said rigidly stationary anvil and stopping movement of said materials at intermittent rests, and an element supported above and cooperating with said anvil for pressing the superimposed or overlapped portions of said materials against said anvil to effect adhesive attachment of said portions during said spaced rests along the line passing over said anvil.

5. A machine for adhesively attaching separate sections of superimposed or overlapped textile materials or the like one of which has adhesive material along a line for attachment to the other, comprising an anvil, means for heating said anvil, a device for moving said superimposed or overlapped portions of said materials across said anvil and intermittently stopping said materials at spaced rests, and a plunger supported for movement toward and from said anvil to cooperate therewith during said rests and thereby effect thermal adhesive attachment of said superimposed or overlapped portions of said materials at spaced points along the line that passes over said anvil.

6. A machine for adhesively attaching separate sections of superimposed or overlapped textile materials or the like comprising a work plate, a rigid anvil extending upwardly through said work plate, means for heating said anvil, a plunger supported above said work plate for movement toward and from said anvil to apply intermittent pressure against the materials passing across said anvil, a device for moving portions of said superimposed or overlapped materials intermittently across said work plate and across said anvil and stopping said materials in positions of spaced rests, and a presser foot element cooperating with said last named device and having a smooth under surface leaving said last named device free to move said materials across said anvil and stop said materials as aforesaid.

7. A machine for adhesively attaching separate sections of superimposed or overlapped textile materials or the like comprising a work plate, a device for moving the materials intermittently in one direction across said work plate and stopping said materials in positions of spaced rests, an anvil arranged adjacent to said device, means for heating said anvil, means for insulating said anvil from said work plate and said device, and a heated presser member movable toward and from said anvil to press together portions of materials and effect thermoplastic adhesive attachment of said materials at spaced intervals along the line thereof passing over said anvil.

HARRY JOHNSTON.

CERTIFICATE OF CORRECTION.

Patent No. 2,322,298.   June 22, 1943.

HARRY JOHNSTON.

It is hereby certified that error appears in the printed specification of the above numbered patent requiring correction as follows: In the grant, lines 5 and 16, and in the heading to the printed specification, line 7, for "Wilton Rubenstein" read --Wilton Rubinstein--; as shown by the record of assignments in this office; and that the said Letters Patent should be read with this correction therein that the same may conform to the record of the case in the Patent Office.

Signed and sealed this 31st day of August, A. D. 1943.

(Seal)

Henry Van Arsdale,
Acting Commissioner of Patents.